(No Model.)
J. P. HAZEN.
CHICKEN COOP.
No. 571,592. Patented Nov. 17, 1896.
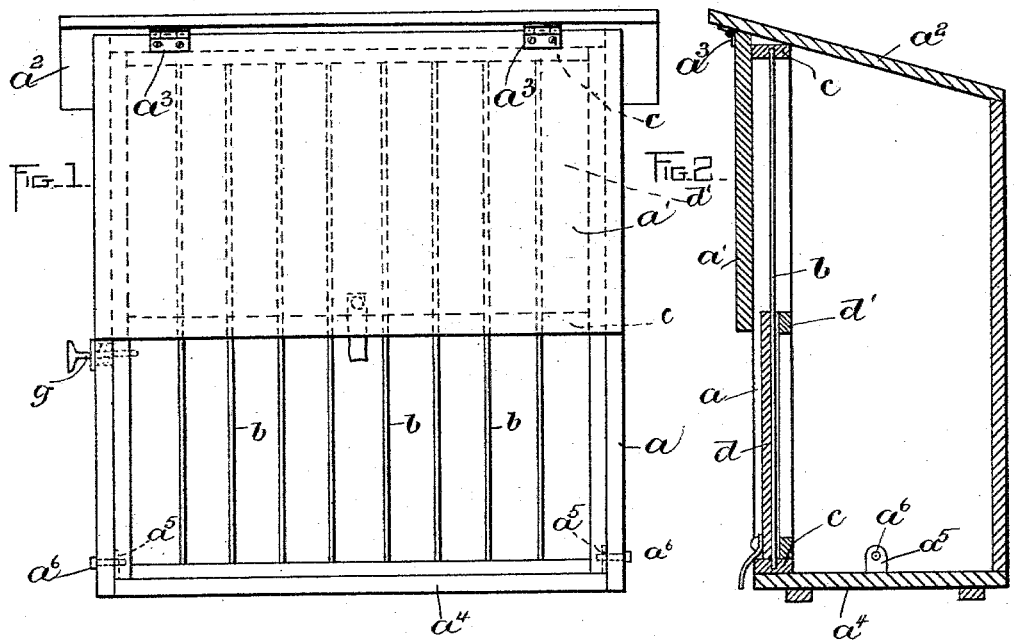
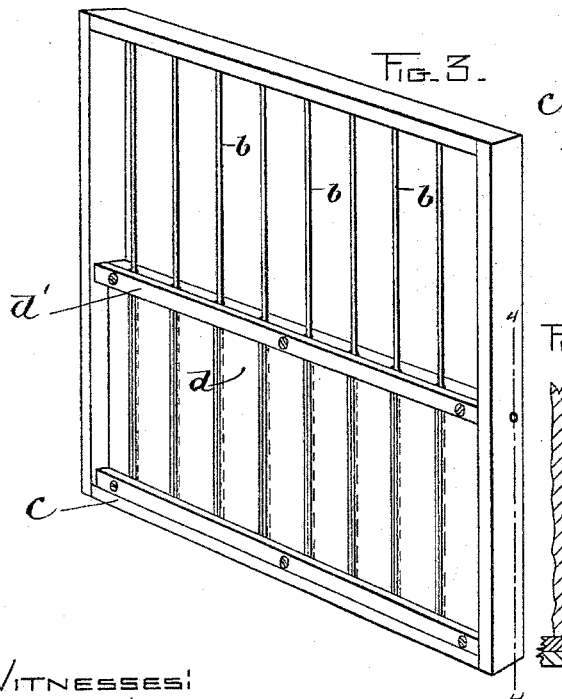
Witnesses:
A. D. Harrison.
A. W. Adams
Inventor:
J. P. Hazen
by Knight Bros & Quinby
Attys.

UNITED STATES PATENT OFFICE.

JACOB P. HAZEN, OF SHIRLEY, MASSACHUSETTS.

CHICKEN-COOP.

SPECIFICATION forming part of Letters Patent No. 571,592, dated November 17, 1896.

Application filed April 8, 1896. Serial No. 586,695. (No model.)

*To all whom it may concern:*

Be it known that I, JACOB P. HAZEN, of Shirley, in the county of Middlesex and State of Massachusetts, have invented certain new and useful Improvements in Chicken-Coops, of which the following is a specification.

This invention has for its object to provide a simple and durable chicken-coop having a grated front adapted to admit light and air to the coop and a solid slide or cover adapted to be adjusted either to close the grated opening or to open the same.

The invention consists in the improvements which I will now proceed to describe and claim.

Of the accompanying drawings, forming a part of this specification, Figure 1 represents a front elevation of my improved chicken-coop. Fig. 2 represents a section on line 2 2 of Fig. 1. Fig. 3 represents a perspective view of the grated frame attached to the front portion of the coop. Fig. 4 represents a section on line 4 4 of Fig. 3.

The same letters of reference indicate the same parts in all the figures.

In carrying out my invention I construct a chicken-coop having a suitable bottom, sides, and top, adapted to form an inclosure of suitable size and made practically water-tight, excepting at the front, where an opening $a$ is provided, extending from the bottom halfway or thereabout to the top, and also extending from end to end of the coop. In other words, I provide the coop with an imperforate front piece $a'$, extending from the roof partly to the bottom, said front piece terminating above the bottom to form an opening $a$. Within the coop and suitably secured to the top, ends, and bottom thereof is a rectangular frame $c$, to which are affixed vertical wire rods $b$, forming a grating adapted to prevent the escape of chickens from the coop.

$d$ represents a slide, which is grooved upon its back side to receive the wires $b$ $b$ and is provided with transverse cleats or cross-bars $d'$, extending across the back sides of the wires. The slide $d$ is adapted to move vertically upon the wires $b$, the latter constituting guides for the slide. The described engagement of the slide with the wires enables the slide to support the wires laterally, and prevent their being sprung out of place by the effort of chickens to push through the spaces between the wires, the wires being supported laterally by the grooves in the slide. The slide, when in its lowest position, covers the opening $a$, as shown in Fig. 2, thus preventing the admission of rain into the coop. A suitable catch $g$ is provided to hold the slide at any desired height to permit the entrance of light into the coop. An ordinary spring-catch, such as is used for window-sashes, may be employed, the frame $d$ being provided with recesses $g'$ to coöperate with said catch.

It will be seen that the described construction is simple and effective, enabling the coop to be readily and quickly closed and opened for the admission of light.

The top $a^2$ is connected by hinges $a^3$ with the body of the coop, so that the top can be raised and held open by a suitable prop. The bottom $a^4$ is made separable from the body, so that it may be removed to give the chickens access to the earth. The bottom may be detachably secured by pins $a^6$, inserted in orifices in the body of the coop and entering orifices in lugs $a^5$, attached to the bottom.

I claim—

1. A chicken-coop having an imperforate front piece $a'$ extending from its top partly to its bottom, an opening below said front piece, a frame secured to the interior of the coop, back of said front piece and opening, and extending from the bottom of the opening upwardly behind the front piece, vertical rods or wires secured to said frame and forming guides extending vertically across the opening and behind the front piece, the portions of the said rods below the front piece constituting guides and also a fixed grating to guard the opening, while their upper portions constitute guides behind the front piece, and an imperforate slide grooved to engage said wires and prevent lateral displacement thereof and movable vertically thereon to open and close the grated opening, said slide having cleats or cross-bars $d'$ extending across the wires, and means whereby it may be supported at different heights.

2. A chicken-coop having an imperforate front piece $a'$ extending from its top partly to its bottom, an opening below said front piece, a frame secured to the interior of the coop, back of said front piece and opening, and extending from the bottom of the opening upwardly behind the front piece, vertical rods or wires secured to said frame and forming guides extending vertically across the opening and behind the front piece, the portions of the said rods below the front piece constituting guides and also a fixed grating to guard the opening, while their upper portions constitute guides behind the front piece, a slide grooved to engage said wires and prevent lateral displacement thereof and movable vertically thereon and provided with cleats $d'$ extending across the wires, a top hinged to the body of the coop, and a bottom detachably secured to said body.

In testimony whereof I have signed my name to this specification, in the presence of two subscribing witnesses, this 31st day of March, A. D. 1896.

JACOB P. HAZEN.

Witnesses:
FANNIE D. MARSHALL,
A. F. FERNALD.